| United States Patent [19] | [11] | 4,197,375 |
|---|---|---|
| Fox | [45] | Apr. 8, 1980 |

[54] PHOTODEGRADABILITY OF PLASTIC POLYOLEFINS

[75] Inventor: Richard C. Fox, San Rafael, Calif.

[73] Assignee: Chevron Research Company, San Francisco, Calif.

[21] Appl. No.: 968,886

[22] Filed: Dec. 13, 1978

Related U.S. Application Data

[63] Continuation-in-part of Ser. No. 859,776, Dec. 12, 1977, abandoned.

[51] Int. Cl.$^2$ ................................................ C08K 5/01
[52] U.S. Cl. .............................. 525/1; 260/DIG. 43; 260/33.6 PQ; 427/336; 427/393.5
[58] Field of Search .................... 260/897 R, 33.6 PQ, 260/DIG. 43; 427/385 B, 336; 526/1

[56] References Cited

U.S. PATENT DOCUMENTS

| 3,523,916 | 8/1970 | Needham et al. | 260/33.6 PQ |
|---|---|---|---|
| 3,797,690 | 3/1974 | Taylor et al. | 260/DIG. 43 |

*Primary Examiner*—V. P. Hoke
*Attorney, Agent, or Firm*—D. A. Newell; John Stoner, Jr.

[57] ABSTRACT

Plastic polyolefins which are resistant to photodegradation are combined with polyisobutylene to improve photodegradability.

5 Claims, No Drawings

PHOTODEGRADABILITY OF PLASTIC POLYOLEFINS

CROSS-REFERENCE TO RELATED APPLICATION

This application is a continuation-in-part of application Ser. No. 859,776, filed Dec. 12, 1977 now abandoned.

BACKGROUND OF THE INVENTION

1. Field of the Invention

The present invention relates to photodegradable plastic polyolefin. More particularly, the invention relates to plastic polyolefin containing polyisobutylene as photosensitizer.

2. Description of the Prior Art

Plastic polyolefins are widely used in the manufacture of many articles. Such articles of importance include disposable containers for food and drinks and the like and films for agricultural mulching.

The plastic polyolefins usually degrade to some degree in the sunlight. This degradation is undesirable with articles of manufacture where durability is important, as in the case of artificial turf for playing fields. Various inhibitors, such as the UV radiation absorbing agents, have been added to inhibit photodegradation. See, for instance, U.S. Pat. No. 3,429,841 describing the addition of 2-hydroxybenzophenone and oxidized polymeric wax to propylene polymer fibers as ultraviolet light absorbers.

However, in the case of plastic polyolefins for disposable containers and agricultural mulching films and the like it is ecologically desirable to get rid of the used containers and mulching film. Photosensitizers have been added to the plastic polyolefins to accelerate degradation on exposure to sunlight, thereby facilitating the disposal of the plastic polyolefin articles. See, for instance, U.S. Pat. No. 4,038,227 describing the use of benzophenone and other additives to promote the degradation of polyolefins and U.S. Pat. No. 3,679,777 describing the use of gamma-pyrone ring-containing compound to accelerate the photodegradability of polyolefins.

Pigments have been incorporated into plastic polyolefins, particularly with the use of dispersants such as mineral oil, polyethylene glycol, dioctylphthalate, polyisobutylene, or butyl stearate. See, for instance, U.S. Pat. No. 3,523,916 describing the admixing of pigments and polyolefin with butyl stearate or low molecular weight liquid polyisobutylene in amounts of from about 0.1 to 0.6 weight percent.

SUMMARY OF THE INVENTION

In accordance with the present invention there is provided a method for improving photodegradability of plastic polyolefin compositions which comprises physically contacting plastic polyolefin compositions which are resistant to photodegradation with a minor proportion of polyisobutylene sufficient to accelerate the photodegradation of the plastic polyolefin, said polyisobutylene having a number average molecular weight of from about 400 to about 900, preferably about 400 to about 700.

The improved plastic polyolefin compositions of the invention and articles thereof degrade upon exposure to sunlight over a determinable period of time, as desired, thereby facilitating their disposal.

DETAILED DESCRIPTION OF THE INVENTION

The plastic polyolefins of the compositions according to the present invention are well known for their use in the molding and casting of articles such as containers and films. Included are high and low density polyethylene, polypropylene, poly-1-butene, polystyrene, and ethylene copolymers, mixtures of polyethylene and polypropylene, as well as mixtures of the aforementioned polyolefins, and the like. Such polyolefins are normally solid.

The plastic polyolefin and polyisobutylene are brought into physical contact and combined in various ways. The plastic polyolefin is conveniently melted and mixed with the polyisobutylene with the aid of a conventional mixer of the Banbury type. The polyisobutylene is also readily added to the plastic polyolefin during other manufacturing operations as, for example, in the use of screw extruders.

A preferred aspect of the improved photodegradable plastic polyolefin compositions of the invention resides in the fact that the polyisobutylene photosensitizer may be applied in the appropriate amounts to the surface of the article of manufacture. The polyisobutylene penetrates the surface and provides the desired degree of photodegradability. For convenience of application, the polyisobutylene photosensitizer may be dissolved in conventional solvents such as petroleum hydrocarbon thinner. Preferably, such solvents evaporate at about room temperature and leave little or no residue other than the polyisobutylene.

The improved plastic polyolefin compositions in accordance with the invention may contain other conventional additives. Included are pigments, antioxidants, plasticizers, etc. Other photosensitizers are also included, such as the benzophenones.

The polyisobutylene photosensitizer is readily characterized by its number average molecular weight, as mentioned above. Such polyisobutylenes are normally liquid and are commonly produced by catalytic polymerization of an isobutylene-rich stream. The preferred polyisobutylenes are also characterized by their viscosities, which range from about 500 to 6,000 SSU at 100° F. and from about 60 to 300 SSU at 210° F. The polyisobutylenes are sold by Chevron Chemical Company as Chevron Polybutenes and are designated according to their "Polybutene Grade" as shown in the following table:

TABLE I

| Physical Properties | Test Method | Polybutene (PB) Grade | | | | | | | | | |
| --- | --- | --- | --- | --- | --- | --- | --- | --- | --- | --- | --- |
| | | 6 | 8 | 12 | 16 | 18 | 22 | 24 | 32 | 122 | 128 |
| Number Average Molecular Weight Mechro Osmometer | SM-180-6 | 330 | 440 | 530 | 640 | 730 | 800 | 950 | 1,400 | 2,500 | 2,700 |
| Viscosity @ 100° F., SSU | ASTM D-445 & D-446 | 134 | 560 | 3,400 | 5,700 | 9,500 | 16,500 | 40,000 | 123,000 | 715,000 | 890,000 |
| Viscosity @ | ASTM D-445 | | | | | | | | | | |

TABLE I-continued

| Physical Properties | Test Method | Polybutene (PB) Grade | | | | | | | | | |
|---|---|---|---|---|---|---|---|---|---|---|---|
| | | 6 | 8 | 12 | 16 | 18 | 22 | 24 | 32 | 122 | 128 |
| 210° F., SSU | & D-446 | 41 | 63 | 163 | 250 | 350 | 550 | 1,050 | 2,990 | 15,800 | 19,500 |

For present purposes the polyisobutylenes having a number average molecular weight of from about 400 to about 900 are most preferred since they provide a desired degree of photodegradability of polyethylene, a preferred embodiment of the invention.

The polyisobutylenes as well as other additives are combined with the plastic polyolefins in the compositions of the invention in any amounts sufficient to accelerate the photodegradation of the polyolefin and provide the desired amount of decomposition along with other physical characteristics. Ordinarily from about 1 to 3% by weight of the polyisobutylene is used based on the plastic polyolefin.

EXAMPLES

The photodegradable plastic polyolefin compositions of the invention are illustrated by the following examples. In these examples a 2-mil commercial polyethylene film was treated with solutions of the additives in petroleum hydrocarbon thinner. After the thinner evaporated, the film was stored inside at 100° F. for 30 days to allow the additives to diffuse into the film prior to outdoor exposure. The 5% solutions provide about 1% by weight of polyisobutylene in the plastic polyolefin. The degradability of the treated polyolefin was evaluated by testing for elongation using an Instron machine in accordance with the general test method outlined in ASTM D-882. The results of the various examples are summarized in the following table:

TABLE II

ELONGATION OF TREATED 2 MIL POLYETHYLENE FILMS

| Example No. | Treatment[1] | Maximum Elongation of Treated Film, % | | | |
|---|---|---|---|---|---|
| | | Freshly Prepared | Stored Inside 30 Days at 100° F. | Stored Inside 30 Days at 100° F. and 120 Days at Room Temperature | Stored Inside 30 Days at 100° F. and Exposed Outside 120 Days[2] |
| 1 | None | 385 | 420 | 300 | 235, 160 |
| 2 | Hydrocarbon Paint Thinner | 365 | 395 | 495 | 200, 150 |
| 3 | Benzophenone (1%) | 365 | 355 | 505 | 10, 15 |
| 4 | PB-8 (5%) | 385 | 390 | 410 | 10, 20 |
| 5 | PB-8 (5%) + Benzophenone (1%) | 375 | 335 | 425 | 10, 10 |
| 6 | PB-16 (5%) | 410 | 375 | 350 | 20, 15 |
| 7 | PB-16 (5%) + Benzophenone (1%) | 345 | 355 | 480 | 25, 15 |
| 8 | PB-32 (5%) | 375 | 360 | 460 | 20, 15 |
| 9 | PB-32 (5%) + Benzophenone (1%) | 355 | 390 | 525 | 80, 20 |
| 10 | PB-128 (5%) | 330 | 305 | 480 | 40, 45 |
| 11 | PB-128 (5%) + Benzophenone (1%) | 330 | 395 | 515 | 20, 15 |
| 12 | Corn Oil 23 (5%) | 395 | 350 | 465 | 60, 56 |
| 13 | Corn Oil 23 (5%) + Benzophenone (1%) | 360 | 300 | 430 | 10, 15 |
| 14 | Corn Oil (5%) | 385 | 330 | 505 | 65, 40 |
| 15 | Corn Oil (5%) + Benzophenone (1%) | 375 | 365 | 495 | 10, 10 |
| 16 | α-Olefin $C_8$–$C_9$ (5%) | 385 | 410 | 435 | 195, 220 |
| 17 | α-Olefin $C_8$–$C_9$ (5%) + Benzophenone (1%) | 290 | 375 | 540 | 10, 15 |
| 18 | α-Olefin $C_{13}$–$C_{14}$ (5%) | 385 | 405 | 450 | 135, 105 |
| 19 | α-Olefin $C_{13}$–$C_{14}$ (5%) + Benzophenone (1%) | 370 | 390 | 375 | 10, 55 |
| 20 | α-Olefin $C_{15}$–$C_{20}$ (5%) | 280 | 375 | 482 | 25, 80 |
| 21 | α-Olefin $C_{15}$–$C_{20}$ (5%) + Benzo- | 250 | 435 | 460 | 15, 10 |

TABLE II-continued
ELONGATION OF TREATED 2 MIL POLYETHYLENE FILMS

| | | Maximum Elongation of Treated Film, % | | | |
|---|---|---|---|---|---|
| Example No. | Treatment[1] | Freshly Prepared | Stored Inside 30 Days at 100° F. | Stored Inside 30 Days at 100° F. and 120 Days at Room Temperature | Stored Inside 30 Days at 100° F. and Exposed Outside 120 Days[2] |
| | phenone (1%) | | | | |

[1] The number in parentheses after the additive is its concentration in the hydrocarbon paint thinner solution used to treat the film.
[2] Duplicate samples.

The above test results show that the low molecular weight polyisobutylenes were particularly effective as indicated by the experiments using PB-8 and PB-16.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. A method for improving photodegradability of plastic polyolefin compositions which comprises physically contacting plastic polyolefin compositions which are resistant to photodegradation with a minor proportion of polyisobutylene sufficient to accelerate the photodegradation of the plastic polyolefin, said polyisobutylene having a number average molecular weight of from about 400 to about 900.

2. A method according to claim 1 wherein the polyisobutylene has a number average molecular weight of from about 400 to about 700.

3. A method according to claim 1 wherein the polyolefin is polyethylene.

4. A method according to claim 3 wherein the polyisobutylene is applied to the surface of the plastic polyethylene by dipping said polyethylene into a hydrocarbon solution of the polyisobutylene.

5. A method according to claim 4 wherein the polyisobutylene is present on the surface of the plastic polyolefin in an amount from about 1 to 3 percent by weight based on the polyethylene.

* * * * *